United States Patent
Dion et al.

(10) Patent No.: US 9,229,923 B2
(45) Date of Patent: Jan. 5, 2016

(54) METHOD AND SYSTEM FOR PRODUCING DOCUMENTS

(75) Inventors: Francis Dion, St-Calixte (CA); Louis-Philippe Perras, Mascouche (CA); Christopher Tully, Uxbridge (CA)

(73) Assignee: TECHNOLOGIES XPERTDOC INC., Terrebonne, QC (CA)

( * ) Notice: Subject to any disclaimer, the term of this patent is extended or adjusted under 35 U.S.C. 154(b) by 494 days.

(21) Appl. No.: 13/534,050

(22) Filed: Jun. 27, 2012

(65) Prior Publication Data

US 2014/0006935 A1    Jan. 2, 2014

(51) Int. Cl.
*G06F 17/24* (2006.01)

(52) U.S. Cl.
CPC ..................... *G06F 17/248* (2013.01)

(58) Field of Classification Search
CPC ............ G06F 17/2247; G06F 17/2264; G06F 17/227; G06F 17/30569; G06F 17/30905; G06F 17/248
USPC ......................................... 715/239, 243, 249
See application file for complete search history.

(56) References Cited

U.S. PATENT DOCUMENTS

| | | | |
|---|---|---|---|
| 5,909,570 A | 6/1999 | Webber | |
| 6,848,078 B1 | 1/2005 | Birsan et al. | |
| 6,952,802 B2 | 10/2005 | Hardy | |
| 7,114,123 B2 | 9/2006 | Chen et al. | |
| 7,434,160 B2 | 10/2008 | Peiro et al. | |
| 7,590,932 B2 | 9/2009 | Britton et al. | |
| 7,805,669 B2 | 9/2010 | Sattler et al. | |
| 7,840,891 B1 | 11/2010 | Yu et al. | |
| 7,849,399 B2 | 12/2010 | Hoffmann | |
| 8,041,746 B2 | 10/2011 | Stuhec | |
| 8,078,956 B1 | 12/2011 | Feldman et al. | |

(Continued)

FOREIGN PATENT DOCUMENTS

WO    WO 2007042337 A1    4/2007

OTHER PUBLICATIONS

PCT/CA2013/050462 International search report and written opinion with related claims 1-17.

(Continued)

*Primary Examiner* — Scott Baderman
*Assistant Examiner* — Seung Jung
(74) *Attorney, Agent, or Firm* — Anglehart et al.

(57) ABSTRACT

A method and system for producing documents with which the quality of a template conversion is increased by presenting to an operator associations of template elements between a source document template and a destination document template and allowing the operator to correct any erroneous association during the conversion. This includes providing a source document template, parsing the source document template into source parsed elements, converting at least some of the source parsed elements that require conversion for a destination document template and thereby providing destination template elements. This further includes presenting to an operator the source parsed elements and the destination template elements with their association and accepting operator input to correct at least some of the destination template elements. Then generating a destination document template from the destination template elements that include operation corrections and generating documents from the destination document template and a data source containing field data.

10 Claims, 14 Drawing Sheets

(56) References Cited

U.S. PATENT DOCUMENTS

| | | |
|---|---|---|
| 8,112,401 B2 | 2/2012 | Blackwood et al. |
| 8,122,367 B2 | 2/2012 | Krieger et al. |
| 8,145,992 B2 | 3/2012 | Jacquin et al. |
| 2004/0060005 A1 | 3/2004 | Vasey |
| 2004/0103367 A1* | 5/2004 | Riss et al. ............... 715/506 |
| 2004/0205467 A1 | 10/2004 | Kofman et al. |
| 2005/0060317 A1 | 3/2005 | Lott et al. |
| 2006/0150088 A1 | 7/2006 | Kraft et al. |
| 2007/0169021 A1 | 7/2007 | Huynh et al. |
| 2008/0065978 A1 | 3/2008 | Francker et al. |
| 2008/0098299 A1 | 4/2008 | Odagiri et al. |
| 2008/0140694 A1 | 6/2008 | Mangla |
| 2009/0132912 A1 | 5/2009 | Sulistio et al. |
| 2009/0287746 A1 | 11/2009 | Brown |
| 2009/0292994 A1 | 11/2009 | Lwo |
| 2010/0058176 A1 | 3/2010 | Carro et al. |
| 2010/0325102 A1 | 12/2010 | Maze |
| 2011/0246869 A1 | 10/2011 | Vion-Dury |
| 2012/0036421 A1 | 2/2012 | Ahn et al. |
| 2012/0197832 A1* | 8/2012 | Shanmukh et al. ............. 706/46 |

OTHER PUBLICATIONS

PCT/CA2013/050462 International preliminary report with related claims 1-15.

* cited by examiner

| Tagged | Original | | Destination | |
|---|---|---|---|---|
| P000001 | TXT | | | |
| P000002 | Please send payment in full by <MOY{SmtDate}> | <> | Please send payment in full by [MOY{SmtDate}] | <> |
| P000003 | PolicyHolder> | | [PolicyHolder] | |
| P000004 | Address1> | | [Address1] | |
| P000005 | City>, <State> <Zip> | | [City], [State] [Zip] | |
| P000006 | Account Summary | | Account Summary | |
| P000007 | Account Number | = | Account Number | = |
| P000008 | AccountNum> | | [AccountNum] | |
| P000009 | Payments (Last 30 Days) | | Payments (Last 30 Days) | |
| P000010 | Pol_Amt{Payments}> | | [Payments] | |
| P000011 | Total Account Balance | | Total Account Balance | |
| P000012 | Pol_Amt{Balance}> | <> | [Balance] | <> |
| P000013 | Charges Pending With Insurance | | Charges Pending With Insurance | |
| P000014 | Pol_Amt{PendingChrg}> | | [PendingChrg] | |
| P000015 | Amount Due | = | Account Due | = |
| P000016 | Pol_Amt{AmtDue}> | | [AmtDue] | |
| P000017 | About Your Statement | | About Your Statement | |
| P000018 | Thank you for choosing INSHURE HealthPLAN for your insurance needs. This is a statement of your account for services provided. Detailed information on each service rendered can be found on the in the HealthPLAN policy. The balances due for each service are added together to arrive at the total amount due from you. <IF{AmtDue > 0, "Any outstanding balance is due thirty (30) days from the Statement Date."}> | | Thank you for choosing INSHURE HealthPLAN for your insurance needs. Detailed information on each service provided. Detailed information on each service rendered can be found on the in the HealthPLAN policy. The balances due for each service are added together to arrive at the total amount due from you. [IFAmtDue] "Any outstanding balance is due thirty (30) days from the Statement Date.[End]] | |
| P000019 | If you have any questions, please call us at <PhoneNum>. Our account representatives are available from 9:00 am to 4:00 pm, Monday to Friday, or use our Automated Voice Telephone System which is available 24-hours a day | <> | If you have any questions, please call us at [PhoneNum]. Our account representatives are available from 9:00 am to 4:00 pm, Monday to Friday, or use our Automated Voice Telephone System which is available 24 hours a day | <> |

FIG 5A

| Original |
|---|
| <Dol_Amt(Payments)> |
| Total Account Balance |
| <Dol_Amt(Balance)> |
| Charges Pending With Insurance |
| <Dol_Amt(PendingChrg)> |
| Amount Due |
| <Dol_Amt(AmtDue)> |
| About Your Statement |
| Thank you for choosing INSHURE HealthPLAN for your insurance needs. This is a statement of your account for services provided. Detailed information on each service rendered can be found on the in the HealthPLAN policy. The balances due for each service are added together to arrive at the total amount due from you. <IF(AmtDue > 0, "Any outstanding balance is due thirty (30) days from the Statement Date.", "")> |
| If you have any questions, please call us at <PhoneNum>. Our account representatives are available from 9:00 am to 4:00 pm, Monday to Friday, or use our Automated Voice Telephone System which is available 24-hours a day |

| Element | ID | Ref | Log |
|---|---|---|---|
| <Out_Amt(Balance)> | P000012 | Tempi-Cri-001 | Imported J. Smith 4/1/12 |
| 128.00 $ | P000012 | Out-Cri-002 | Imported J. Smith 4/1/12 |
| (Balance) | P000012 | Tempi-Dest-003 | Converted J. Smith 4/1/12 Code change F. Dion |
| 128.00 $ | P000012 | Out-Dest-004 | Generated F. Dion 4/2/12 |
| Thank you for choosing INSURE HealthPLAN for your insurance needs. This is a statement of your account for services provided. Detailed information on each service rendered can be found in the HealthPLAN policy. The balances due for each service are added together to arrive at the total amount due from you. <IF{AmtDue > 0, "Any outstanding balance is due thirty (30) days from the Statement Date." | P000013 | Tempi-Cri-005 | Imported J. Smith 4/1/12 |
| Thank you for choosing INSURE HealthPLAN for your insurance needs. Detailed information on each service rendered can be found in the HealthPLAN policy. The balances due for each service are added together to arrive at the total amount due from you. | P000016 | Out-Cri-006 | Imported J. Smith 4/1/12 |
| Thank you for choosing INSURE HealthPLAN for your insurance needs. This is a statement of your account for services provided. Detailed information on each service rendered can be found in the HealthPLAN policy. The balances due for each service are added together to arrive at the total amount due from you. Any outstanding balance is due thirty (30) days from the Statement Date. | P000019 | Out-Cri-007 | Imported J. Smith 4/1/12 |
| Thank you for choosing INSURE HealthPLAN for your insurance needs. This is a statement of your account for services provided. Detailed information on each service rendered can be found in the HealthPLAN policy. The balances due for each service are added together to arrive at the total amount due from you. {IFAmtDue} "Any outstanding balance is due thirty (30) days from the Statement Date." | P000013 | Tempi-Dest-008 | Converted J. Smith 4/1/12 |
| Thank you for choosing INSURE HealthPLAN for your insurance needs. Detailed information on each service rendered can be found in the HealthPLAN policy. The balances due for each service are added together to arrive at the total amount due from you. | P000016 | Out-Dest-009 | Generated J. Smith 4/2/12 |
| Thank you for choosing INSURE HealthPLAN for your insurance needs. This is a statement of your account for services provided. Detailed information on each service rendered can be found in the HealthPLAN policy. The balances due for each service are added together to arrive at the total amount due from you. Any outstanding balance is due thirty (30) days from the Statement Date. | P000019 | Out-Dest-010 | Generated J. Smith 4/2/12 |

FIG 9

METHOD AND SYSTEM FOR PRODUCING DOCUMENTS

TECHNICAL FIELD

The present invention relates to a method and system for producing documents more particularly for producing documents from a converted document template.

BACKGROUND

A variety of legacy document automation systems (e.g. Calligo, IStream, Mosaic, etc.) are still being used by the industry. These systems produce personalized documents for mass distribution from a single document template by populating specific portions of the template with personalized content data. Although functional, these legacy systems are obsolete and are becoming unmaintainable due to lack of service. Companies using these legacy systems are finding it more and more difficult to produce new templates or modify existing templates and are showing increased interest in migrating to newer systems. However, extensive effort is required for migrating to a modern system as all templates used with the legacy system must be converted for being usable by the newer system. The cost and effort required in generating converted templates while assuring an acceptable conversion quality is known to be challenging.

Depending on the area of application, it may be very important to generate converted templates that are identical to the original template particularly from an insurance perspective. There are numerous examples, in which companies have used an available automated template converter but the converted template still required being manually reviewed and modified for conforming to the original template. The reviewing and modifying process of converted templates is an arduous task that is not fail-proof. In many cases, each converted template must be approved by various departments of an organization. Depending on the number of templates to approve, the whole template conversion process is known to take several months or even several years, making the cost of migrating to a newer document automation system highly expensive.

Therefore there is a need for producing documents from a converted template that are identical to documents produced from an original template and for which the converted template is generated without requiring an extensive amount of effort.

SUMMARY

It has been discovered that the quality of a template conversion is increased by presenting to an operator associations of template elements between an original template and a destination template and allowing the operator to correct any erroneous association during the template conversion process.

It has been further discovered that quality control of a template conversion is facilitated by allowing an operator to trace an origination and further modifications to associations of template elements that occurred during the conversion process.

According to one aspect of the present invention, there is a method for producing documents. The method includes providing a source document template, (e.g. an original template document of a legacy system), parsing the source document template into source parsed elements which could represent fixed text, data source field, logic, etc. The method further includes converting at least some of the source parsed elements that require conversion for a destination document template (i.e. converted template for being used with a newer or another system) and thereby providing destination template elements. Then presenting to an operator the source parsed elements and the destination template elements with their association and accepting operator input to correct at least some of the destination template elements. Then further generating a destination document template from the destination template elements that include operation corrections and generating documents from the destination document template and a data source containing field data.

According to another aspect of the present invention, there is a system for producing a destination document template from a source document template. The system includes a parsing module, a destination element converter, an auditor module and a destination document template generator. The parsing module being for parsing the source document template into parsed elements. The destination element converter being for converting at least some of the parsed elements into destination template elements. The auditor module being for presenting to an operator the source parsed elements and the destination elements and for accepting operator input to correct at least some of the destination elements, each of the destination elements being presented in association with at least one of the source parsed elements. The destination document template generator being for generating the destination document template from the destination elements according to the operator input.

According to yet another aspect of the present invention, there is a destination document generation system for producing documents from a source document template. The system includes a template input port, a data field input port and a destination document generator. The template input port being for receiving a destination document template that has been generated according to the source document template. The data field input port being for receiving data field information indicative of content information for populating the destination document template. The destination document generator being for generating the documents according to the destination document template and the data field information.

BRIEF DESCRIPTION OF THE DRAWINGS

The invention will be better understood by way of the following detailed description of embodiments of the invention with reference to the appended drawings, in which:

FIG. 5A illustrates an interface for presenting and correcting associations of source elements with destination template elements, according to one embodiment;

DETAILED DESCRIPTION

Document automation systems are used for mass production of documents, based on a template the system produces multiple documents each containing personalized information. The templates are system dependent and when migrating to a new system the original templates must be converted to be compatible.

Figure 1A:
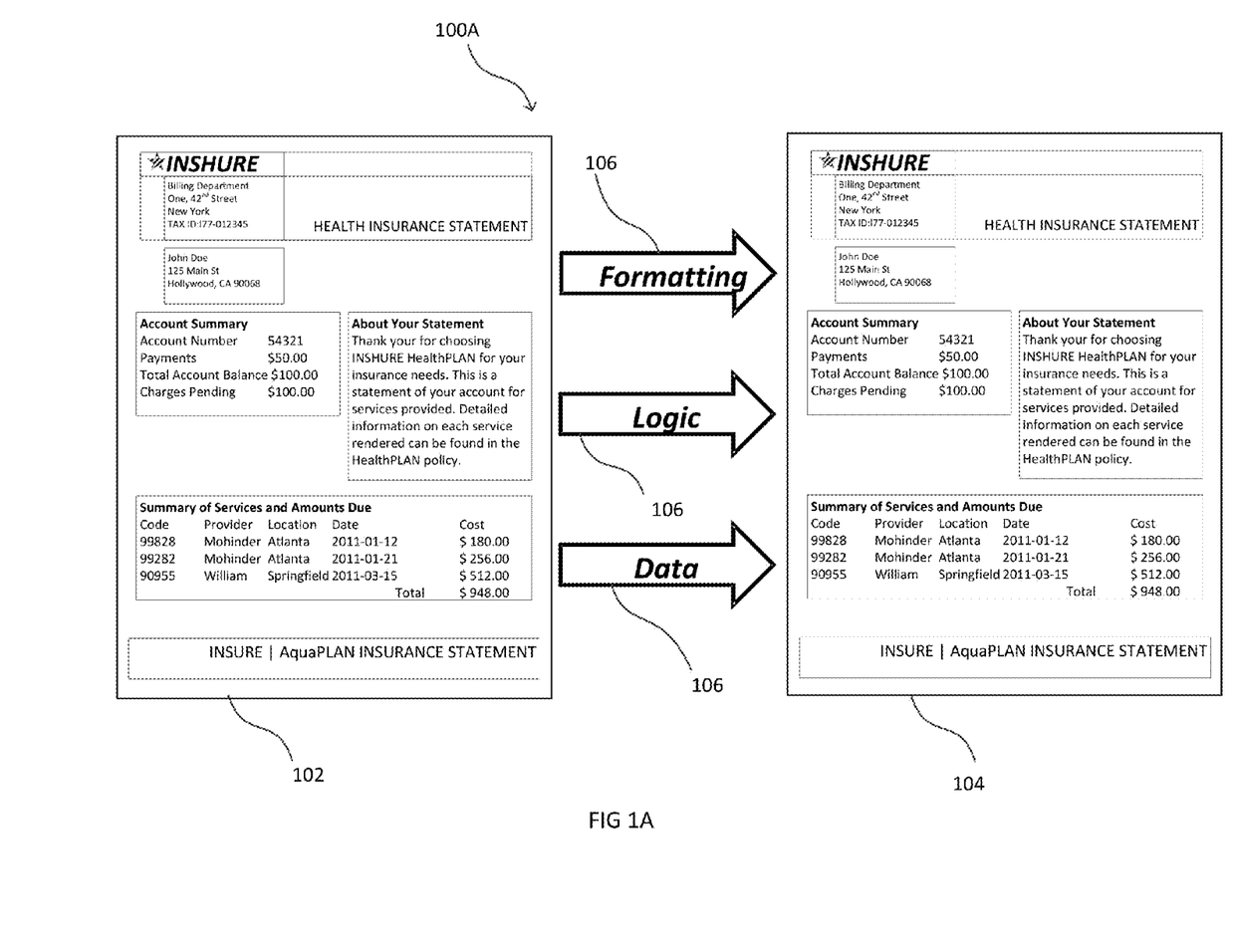
FIG. 1A illustrates a document produced from a first document automation system using a source document template and another document produced from a second document automation system using a destination document template that has been converted from the source document template to maintain formatting, logic and data information, according to one embodiment.

Presented in FIG. 1A is a high level illustration of a successful document template conversion method 100A. A source template usable by a legacy document automation system is converted to a destination template that is compatible with a newer document automation system. In this example, a first document 102 is produced by the legacy system with the source template and a second document 104 is produced by the newer system with the destination template. Notice that both documents (102 and 104) are visibly identical. The successful document template conversion method ensures that information 106 such as formatting information, logic information and data information is accurately transferred from the source template to the destination template, during the conversion method 100A.

Figure 1B:
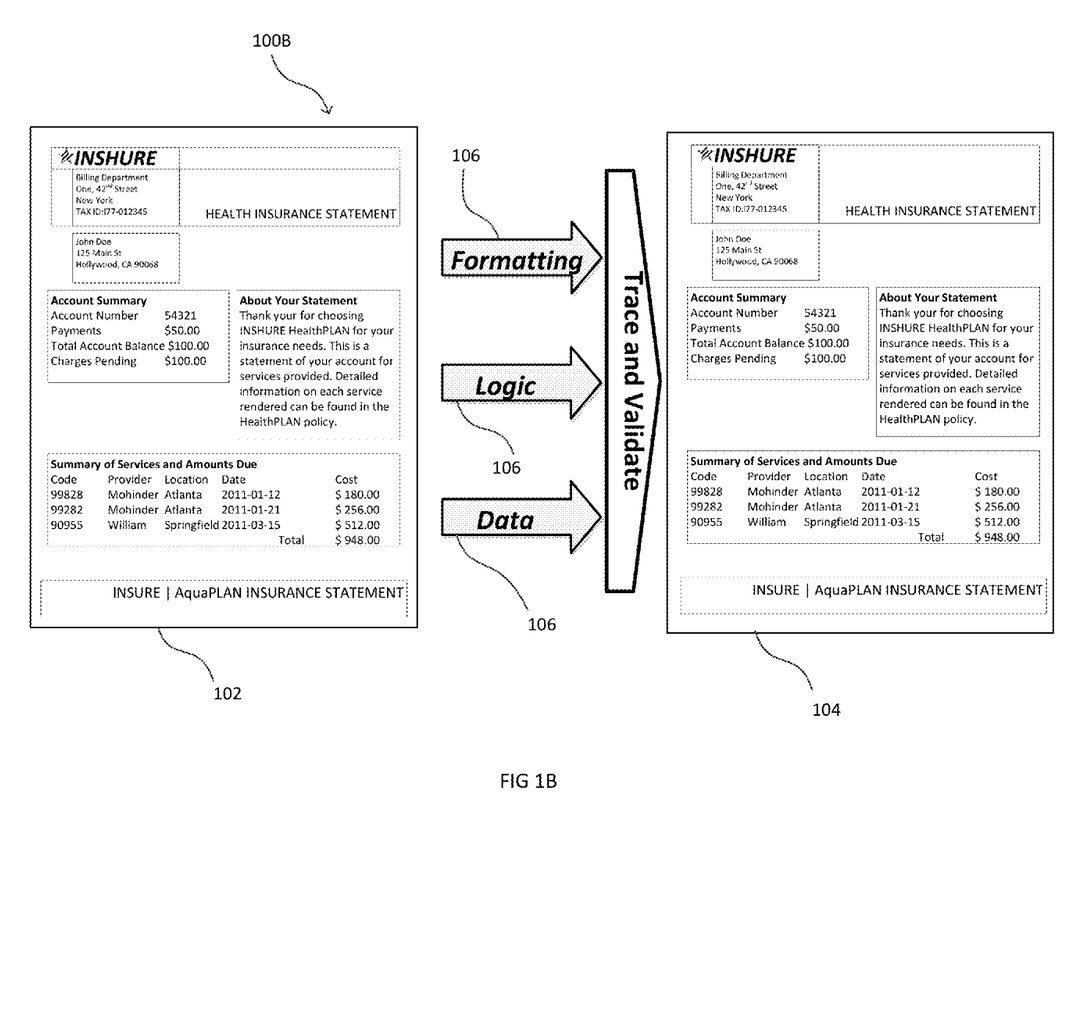
FIG. 1B illustrates a document produced from a first document automation system using a source document template and another document produced from a second document automation system using a destination document template that has been converted from the source document template to maintain formatting, logic and data information, according to another embodiment.

Presented in FIG. 1B is another high level illustration of an alternate successful document template conversion method 100B. During the conversion 100B, a trace of changes made to the information 106 is kept to validate the template conversion before producing a validated destination template. The validated destination template is then used by the new system for producing the second document 104 this assures that the second document 104 is identical to the first document 102, for quality control purposes.

Figure 2A:
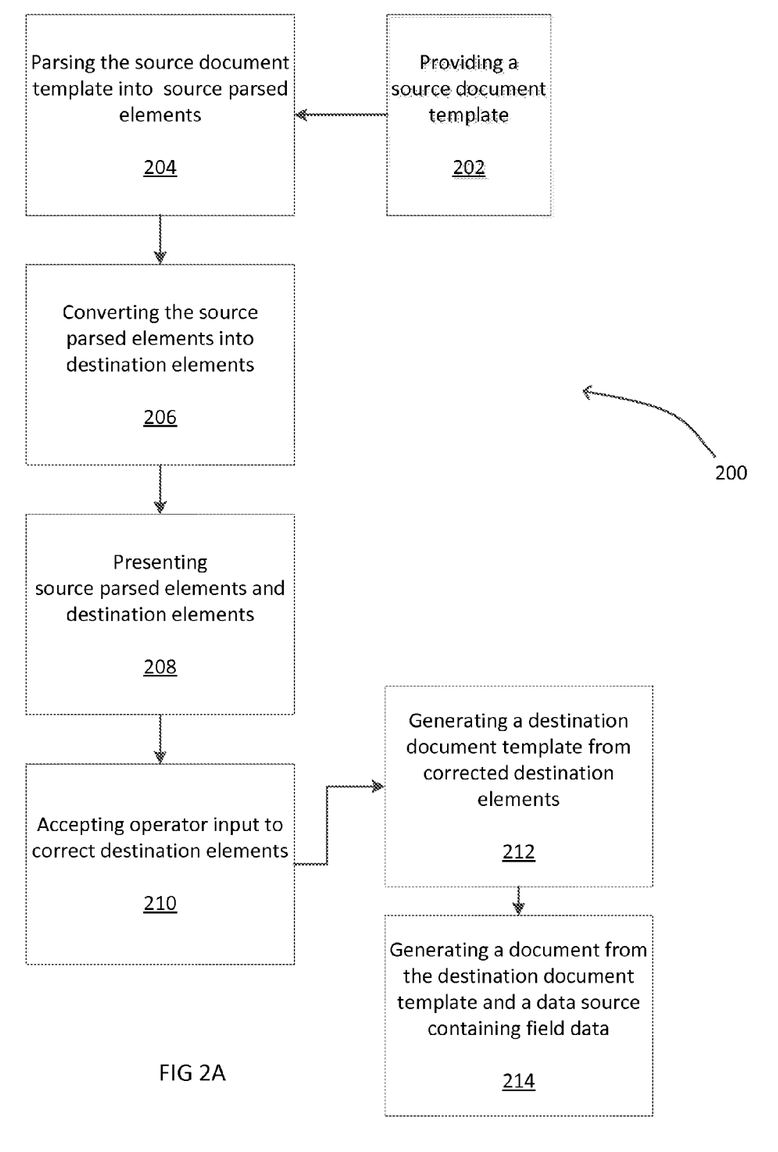
FIG. 2A illustrates a method for producing documents from a source document template, according to one embodiment.

Illustrated in FIG. 2A is a diagram presenting the steps of a method for producing documents 200 with a newer document automation system from a source document template, according to one embodiment. This method 200 is used when the source document template is incompatible with the newer system and must be converted into a compatible destination document template that is usable by the newer system for producing documents. In the method 200, a source document template is provided, at step 202, for being parsed into source parsed elements by a computer, at step 204. The source parsed elements may represent various elements of a document such as fixed text, data source fields and logic information. These elements are converted into destination template elements at step 206, according to predetermined conversion rules. Note that it is possible that only some elements require conversion and that some elements may not require conversion or be found unnecessary for generating the destination template elements of the corresponding destination document template.

Once the required elements are converted, the source parsed elements and the destination elements are presented to an operator as in step 208. This is achieved by presenting to the operator an association of each destination template elements with at least one of the source parsed elements. As an example, FIG. 5A shows a user interface 404 in which a tagged column 502 identifies each element association. A source parsed element column 504 is listed and a destination template element column 508 is listed, each of the elements of column 508 is associated to a corresponding element column 504. An association indicator is further listed in association column 506 for each of the destination template elements. Notice that for some source parsed elements there is no corresponding destination template element. One explanation is that, as mentioned above, some source parse elements may simply be unnecessary for generating the destination document template. Another explanation is that at the converting step 206, it was not possible to determine a corresponding destination template element. In the latter case, the operator is given the opportunity to input a destination template element in the empty field.

Returning to FIG. 2A, at step 210, an operator input is accepted to correct a destination template element. Here, the operator is given the opportunity not only to correct an empty field of the destination template element but also to correct a destination template element of an incorrect conversion. According to one embodiment, the same interface 404 of FIG. 5A is used to accept the operator's corrective input. Conveniently, while reviewing the associations (i.e. destination template elements associated with the source parsed elements), the operator may input any necessary correction.

In the following step 212, a destination document template is generated from the destination template elements which have been reviewed and corrected by the operator in the previous steps. Documents for mass distribution are then generated from the destination document template, at step 214. The documents are generated based on the destination document template and according to personalized field data content normally stored in a data source.

Figure 2B:
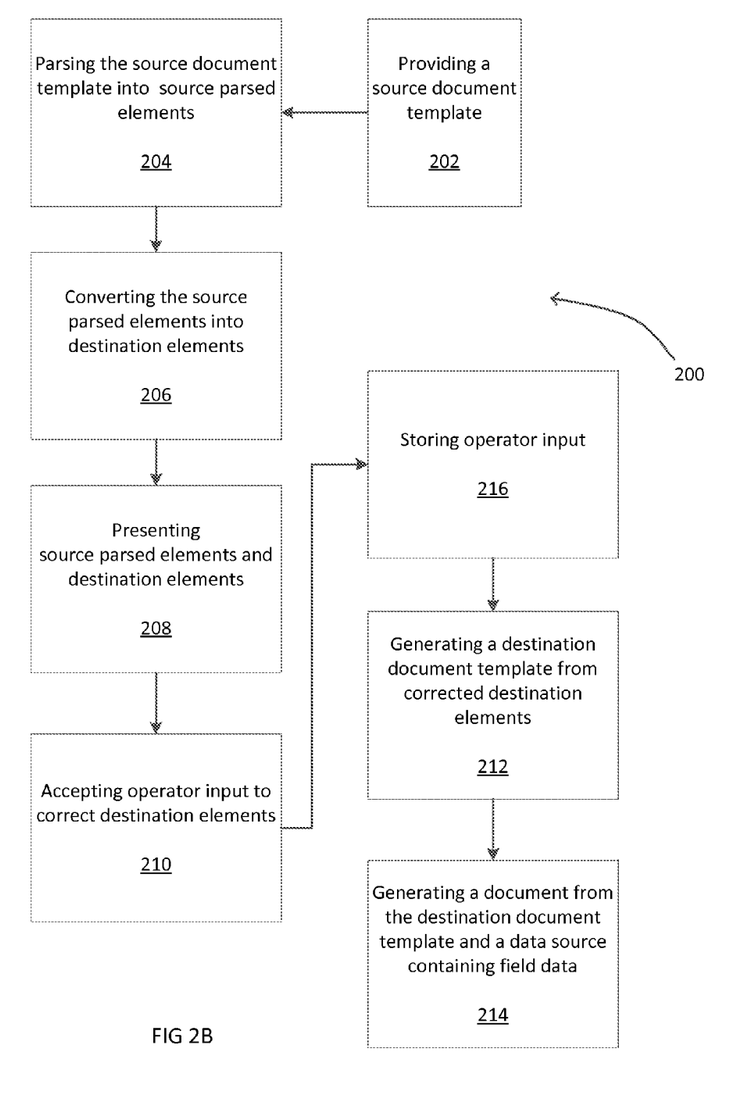
FIG. 2B illustrates a method for producing documents from a source document template, according to one embodiment.

Presented in FIG. 2B, the method 200 has the additional step of storing 216 the corrective operator input into a database of conversion rules. The corrective operator input may then be used in a subsequent conversion.

Figure 2C:
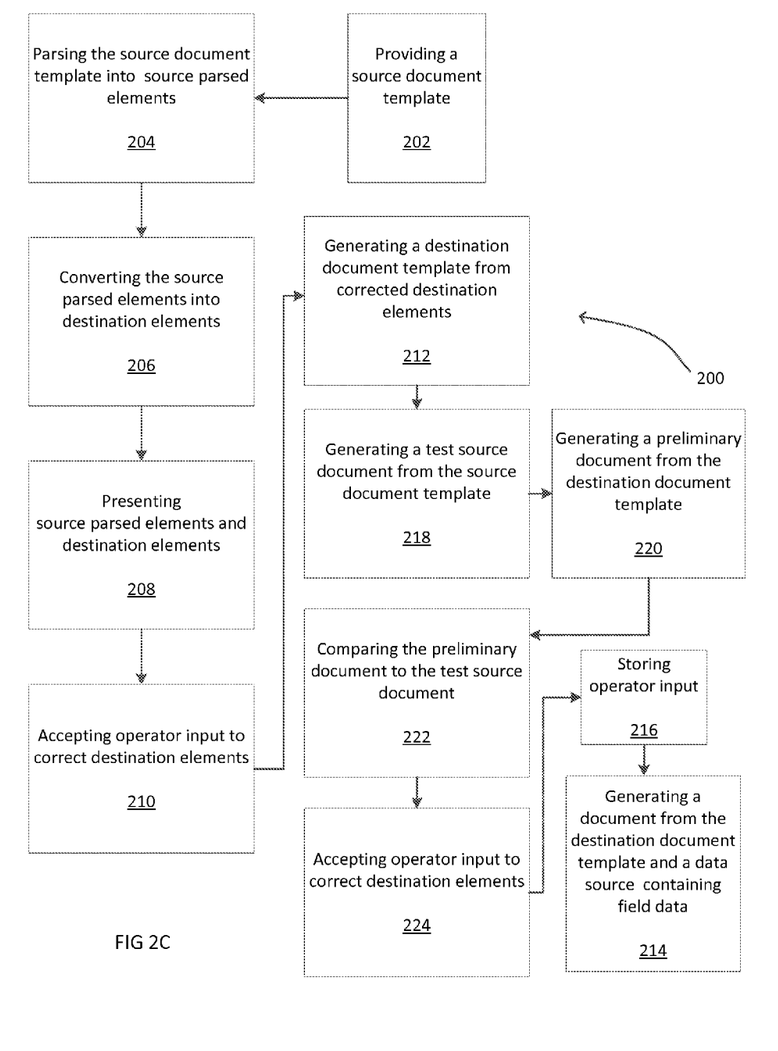
FIG. 2C illustrates a method for producing documents from a source document template, according to one embodiment.

Presented in FIG. 2C, the method 200 has the additional steps of generating a test source document 218, generating a preliminary document 220 and comparing the preliminary document to the test source document 222. At step 218, the test source document is generated with the legacy system or an emulator of the legacy system according to the source document template and field content data. At step 220, the preliminary document is generated with the newer system or an emulator of the newer system according to the destination document template and field content data. At step 222, the comparison information may be presented to the operator for evaluating a quality of the destination document template and providing additional corrective input to correct some of the destination template elements. Alternatively the comparison 222 allows a computer to automatically evaluate a quality of the destination document template and provide corrections to the destination template elements accordingly.

Further presented in FIG. 2C, the method 200 has the step of storing 216 the corrective operator input or corrections provided by the computer into a database of conversion rules. The corrective operator input may then be used in a subsequent conversion.

Figure 3:
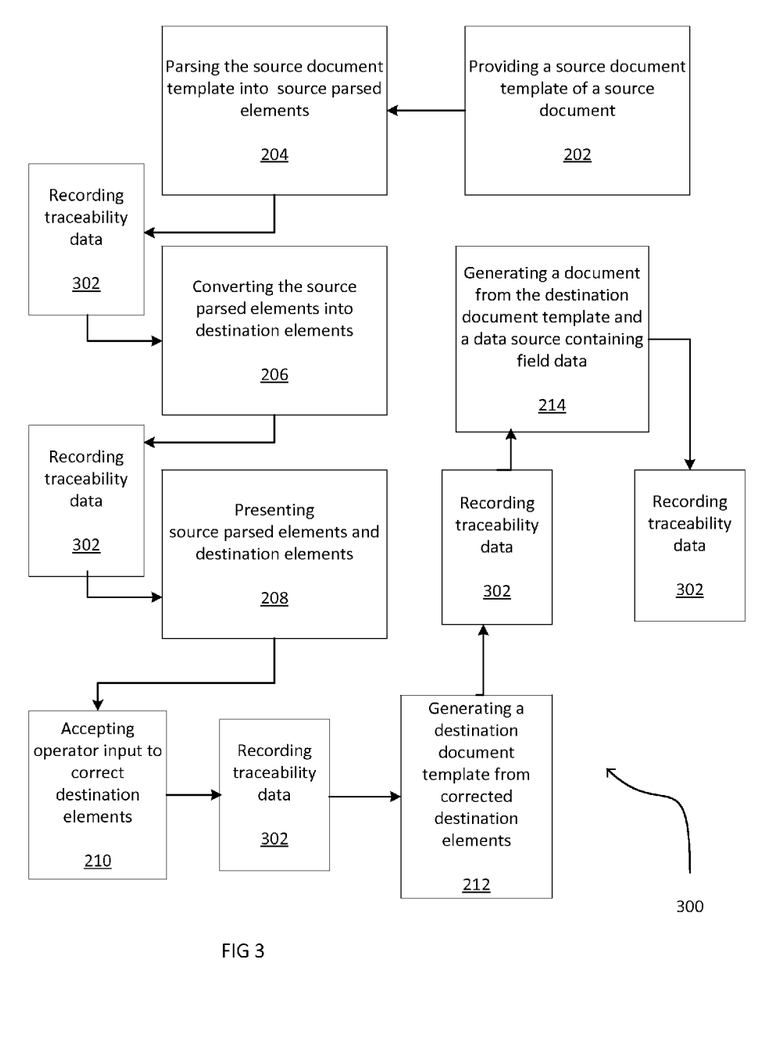
FIG. 3 illustrates a method for producing documents from a source document template, according to another embodiment.

Presented in FIG. 3 is an alternate method 300 for producing documents. The method includes the steps illustrated in FIG. 2 with the additional step of recording traceability data 302. During the generation of a destination document template, traceability data is recorded for tracing an origination, a modification or a sequence of modifications concerning a destination template element corresponding to an element of the source template document. The objective here is to provide an indication of the origination, the modification or the sequence of modifications originated from at least one of the steps of parsing 204, converting 206, accepting operator input 210, generating the destination document template 212 or generating a document 214.

Figure 4:
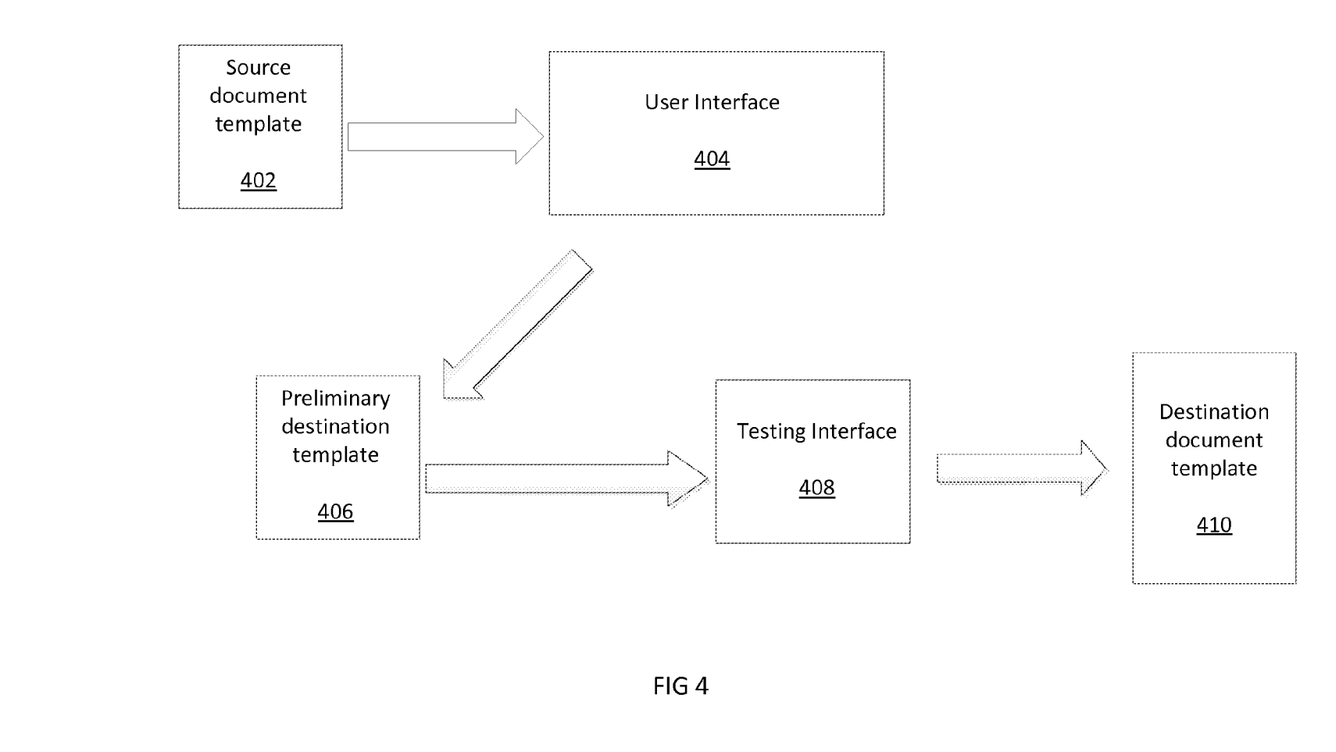
FIG. 4 graphically illustrates a method for producing documents from a source document template, according to one embodiment.

Illustrated in FIG. 4 is an application of the method 200. The source document template is a Word™ template 402 and for this template 402, the user interface 404 is generated presenting conversion associations between elements of the template 402 and destination template elements. With the interface 404, the user can review and correct some conversion associations. The various components of the interface 404 is explained in further detail below. A preliminary destination template 406 is further generated based on the destination template elements and the corrections provided by the user. In this particular case, the preliminary destination template 406 is an OOXML™ file format. Note however that the method 200 may generate preliminary destination templates of any other suitable file formats that can be read by the new system. The preliminary destination template 406 is then tested by an automated routine and test results are presented to the operator through a testing interface 408 in which the preliminary destination template 406 is tested with personalized data fields. In addition to presenting the test results to the operator, the testing interface 408 is adapted to accept corrective input form the operator. The various components of the testing interface 408 are explained in further detail below. Once tested, corrected and approved, an approved destination document template 410 is then generated.

Figure 5B:
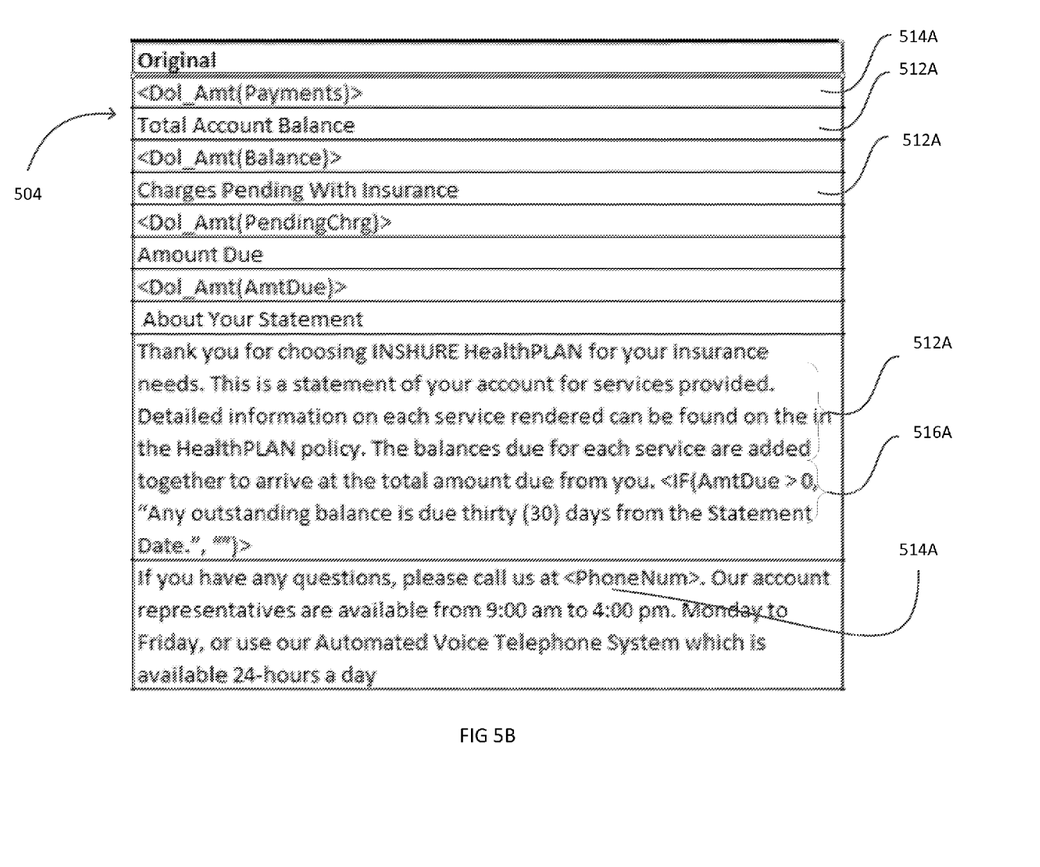
FIG. 5B illustrates a portion of the interface of FIG. 5A presenting source elements.
Figure 5C:
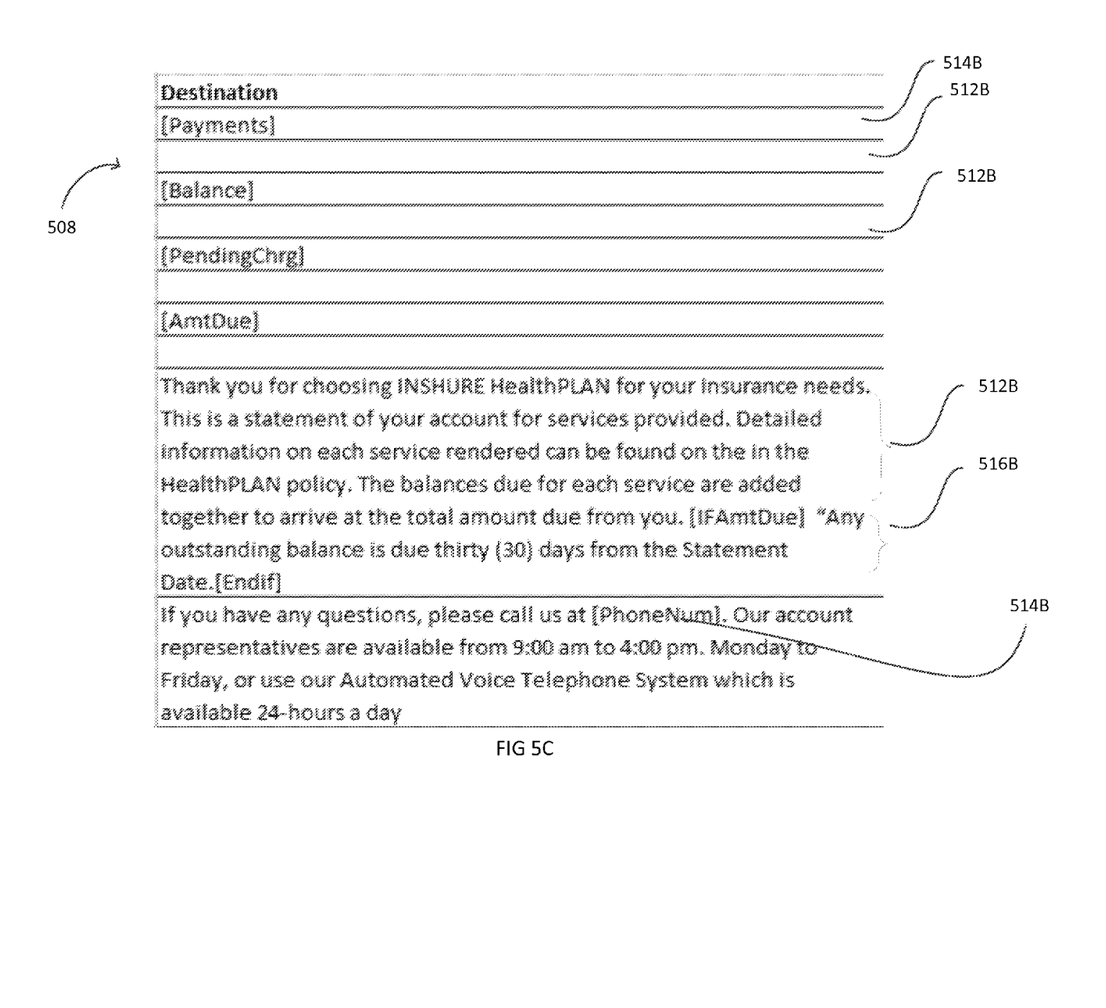
FIG. 5C illustrates a portion of the interface of FIG. 5A presenting destination elements.

FIG. 5A illustrates an example of the user interface 404 having a list of parsed elements 504 corresponding to the source document template 402 and a list of converted destination template elements 508 with their corresponding associations 506. FIG. 5B presents a magnified view of the user interface 404 showing the list of parsed elements 504. The parsed elements 504 include fixed text 512A, data source fields 514A (ex.: XML tags) and logic information 516A. FIG. 5C presents a magnified view of the user interface 404 showing the list of destination template elements 508. Notice that some lines are left blank, indeed the first lines of fixed text 512B are omitted but in other lines elements of fixed text 512B have been converted. Also some data source fields 514B have been converted, indeed the field "<Dol_Amt(payments)>" is converted as "[Payments]" and logic information 516B has been converted as well.

Figure 6:
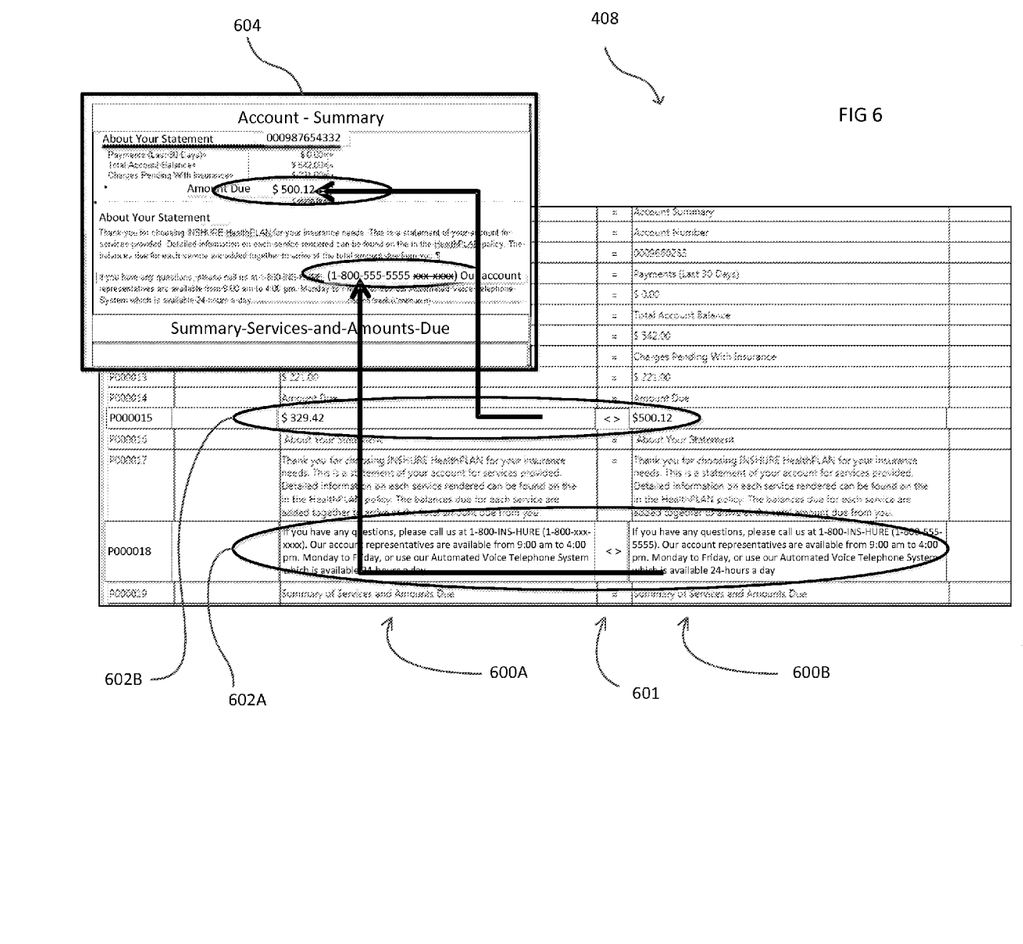
FIG. 6 illustrates a testing interface for verifying the associations of the source element with destination template elements, according to one embodiment.

FIG. 6 illustrates the testing interface 408 in which populated fields of the source document template 600A are compared with corresponding populated fields of the destination document template 600B. In this case, differences are identified at lines P000015 and P000018, an unequal symbol in the association column 601 is provided to guide the operator and allow him to make corrections if necessary. Moreover, according to one embodiment, the differences are further identified in a window 604 presenting the corresponding problematic passages within a preliminary document generated to better show how the differences may impact the final documents. Highlights 602A of the identified differences are marked in the testing interface 408 as well as in the preliminary document to guide the operator.

Figure 7:
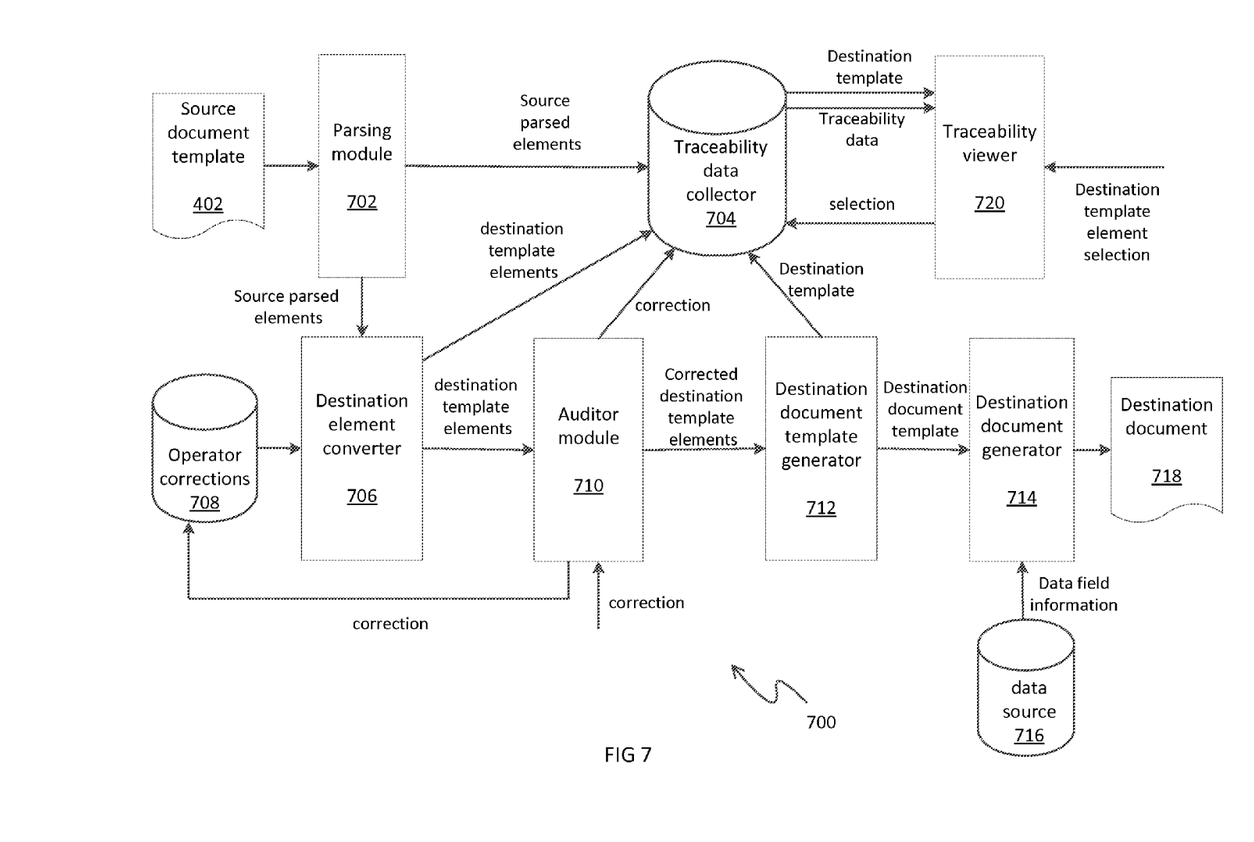
FIG. 7 illustrates a system for producing documents from a source document template, according to one embodiment.

FIG. 7 illustrates the various modules of a system 700 for producing documents from a source document template, according to one embodiment. A parsing module 702 receives as input a source document template 402 and parses the template 402 into source parsed elements. The source parsed elements are transmitted to a destination element converter 706 for converting at least some of the parsed elements into destination template elements. The destination template elements are transmitted to an auditor module for presenting to the operator the source parsed elements and associated destination elements and accepting operator input to correct some destination elements that are incorrectly converted from or incorrectly associated to source parsed elements. In one example, the auditor module is adapted to present to the operator the interface as shown in FIG. 5A. The corrected destination template elements are transmitted to a destination document template generator 712 for generating a destination document template that is compatible with the new document automation system.

Further presented in FIG. 7 according to an alternate embodiment, the system 700 has a destination document generator 714. The generator 714 is adapted to receive the destination document template and with personalized data field information coming from a data source 716 produce destination documents 718. Note that the document generator 714 and the data source 716 may be remotely located from the rest of the system 700 modules such as within a single or multiple external servers.

Figure 8:
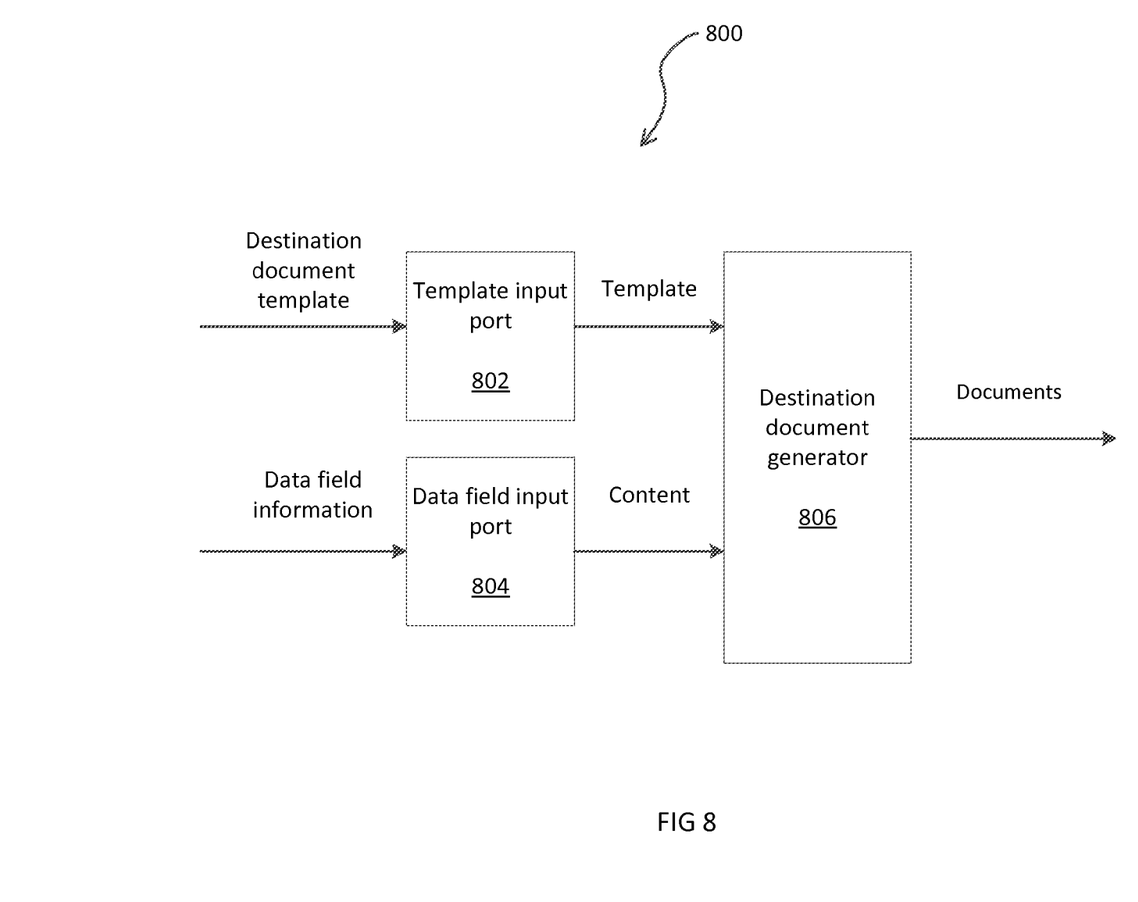
FIG. 8 illustrates a system for producing documents from a destination template that was generated from a source document template, according to one embodiment.

Presented in FIG. 8 is a standalone destination document generation system 800 for producing documents from a source document template, according to one embodiment. As illustrated, the system 800 has a template input port 802, a data field input port and a destination document generator 806. The template input port 802 is adapted to receive a destination document template. The destination document template having been generated according to a source document template. The data field input port 804 is adapted to receive data field information such as personalized content information for populating the destination document template. Both the destination document template and the data field information are transmitted to the destination document generator 806 for generating documents accordingly.

According to a further embodiment, the system 700 has a traceability data collector 704. The collector 704 is adapted to receive at least one of the source parsed elements, destination template elements, corrections made by the operator or destination template from the respective modules (702, 706, 710 and 712) for tracing purposes. Trace information is stored in the collector 704 according to destination document templates and this way the operator may trace an origination or modifications made to elements of a specific destination document template through a traceability viewer 720.

Figure 9:
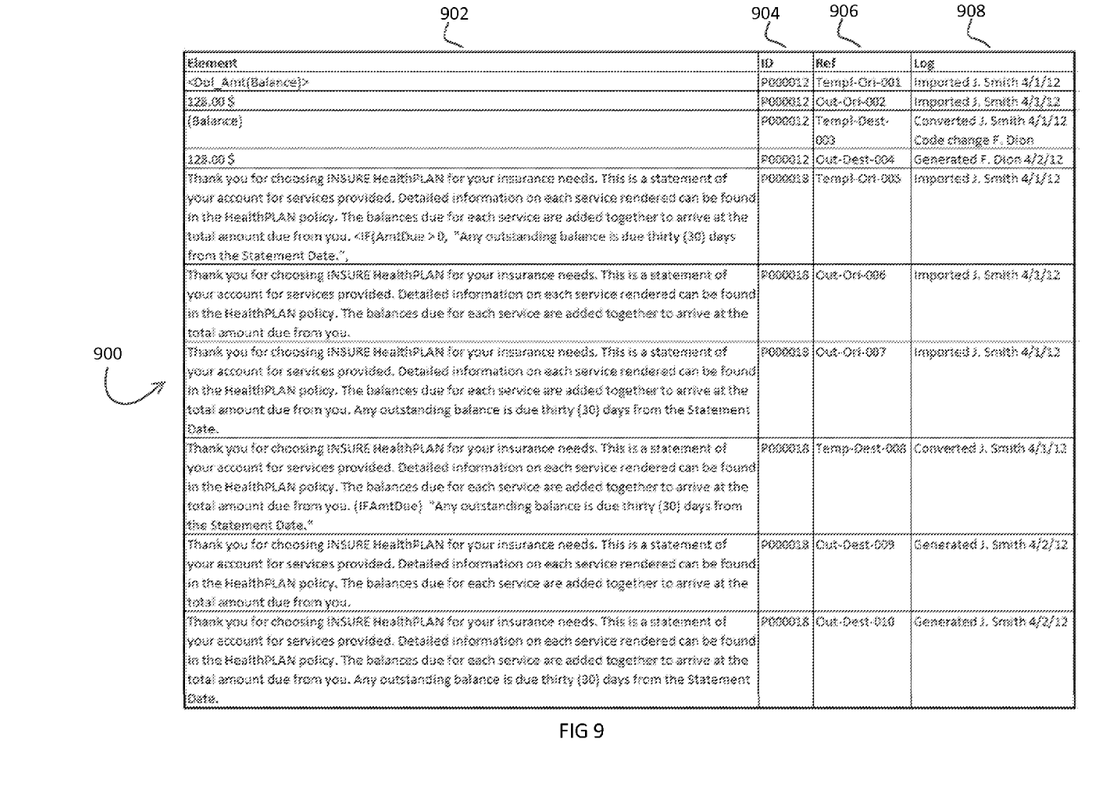
FIG. 9 illustrates an interface of a traceability viewer, according to one embodiment.

According to one example there is presented in FIG. 9, an interface 900 presented by the traceability viewer 720. The interface 900 presents an element column 902, an identifier column 904, a reference column 906 and a log column 908. The elements listed in the element column 902 may be a source parsed element, a destination template element, an element of a source document generated from a source template or an element of a destination document generated from a destination template. For each element listed in the element column 902 there is associated a trace identifier in the identifier column 904, as can be noticed that first four rows are related to the same trace (i.e. P00012) and the other six rows are related to another trace (i.e. P00018). For each trace there is listed the sequence of recorded actions performed by the operator on a reference type as respectively listed in the log column 908 and the reference column 906.

What is claimed is:

1. A method for producing documents comprising:
providing a source document template;
parsing, in a computer, the source document template into source template elements that comprise fixed text, data source fields and logic;
converting, in a computer, at least some of the source template elements requiring conversion for a destination document template to provide destination template elements;
presenting to an operator populated source template elements and populated destination template elements and identifying differences between the populated source template elements and the populated destination elements and presenting a symbol of the differences to the operator, each of the destination template elements being associated with at least one of the source template elements;
accepting operator input to correct at least some of the destination template elements;
generating, in a computer, a destination document template from the destination template elements including operator corrections; and
in a computer, generating a plurality of documents from the destination document template by accepting content from a data source and populating the data source fields and logic in the destination document template with the content.

2. The method as claimed in claim 1 further comprising recording traceability data associated with the destination document template for tracing an origination, a modification or a sequence of modifications concerning a destination template element within the source document and indicating that the origination, the modification or the sequence of modifications originated from at least one of the steps of parsing, converting, accepting operator input, generating the destination document template or generating documents.

3. The method as claimed in claim 1 wherein the presenting to the operator and the accepting operator input are performed through a same user interface.

4. The method as claimed in claim 1 further comprising storing in a database information with respect to the operator input and an association thereof with the corresponding template element.

5. The method as claimed in claim 1 further comprising generating, in a computer, source documents from the source document template and the data source containing field data, and comparing, in a computer, the source documents with the documents generated from the destination document template.

6. The method as claimed in claim 5 further comprising evaluating a quality of the destination document template based on the comparing.

7. The method as claimed in claim 5 further accepting a correction input to correct at least some of the destination template elements based on the comparing.

8. The method as claimed in claim 7 wherein the correction input is generated by a computer according to the comparing and predetermined rules.

9. The method as claimed in claim 8 further comprising storing in a database information with respect to the correction input and an association thereof with the corresponding template element.

10. The method as claimed in claim 1 further comprising transmitting the destination template to at least one document generation server for generating the documents from the destination document template.

* * * * *